Patented Sept. 1, 1936

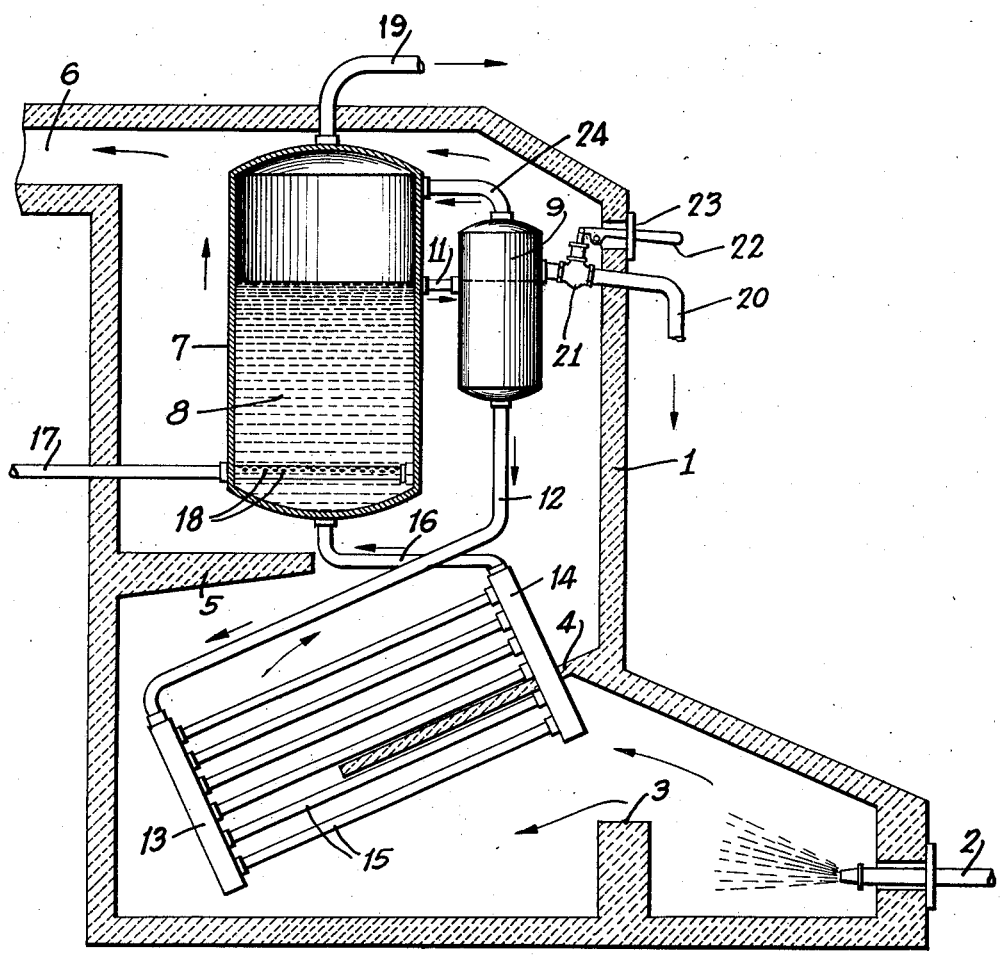

2,053,211

UNITED STATES PATENT OFFICE 2,053,211

CONVERSION OF HYDROCARBONS

Donald S. Villars, Nutley, N. J., assignor to Standard Oil Company (Indiana), Chicago, Ill., a corporation of Indiana Application May 24, 1934, Serial No. 727,227

2 Claims. (Cl. 196—70)

This invention relates in general to the thermal conversion of hydrocarbon fluids and more especially to a method and apparatus for cracking hydrocarbon oils by direct contact with molten material. The invention likewise provides a unique arrangement for removing objectionable heavy constituents formed during the reaction of the hydrocarbon fluid from the surface of the molten material before it is returned to a heating zone to be reheated.

In the heating of hydrocarbon fluids to high temperatures it is of paramount importance to accomplish efficient heat transfer in order to carry out the contemplated reactions. This is especially true when the hydrocarbon fluid to be converted is subjected to intense heat treatment for a relatively short period of time.

In accordance with this invention efficient heat transfer between the hydrocarbon fluid to be converted and molten material, utilized as the fluid heating medium, is accomplished. The hydrocarbon fluid may be dispersed directly into the body of molten material and due to its travel therethrough, the necessary heat for accomplishing the desired conversion thereof is obtained by direct heat exchange between the fluid being converted and the fluid heating medium in a relatively short period of time.

There generally results from the conversion of hydrocarbon fluids a fraction which passes overhead and which comprises the desired light products and a heavy or residual fraction containing liquid and/or solid objectionable constituents such as carbon, reaction products formed with the molten material, tar and other objectionable carbonaceous materials. These heavy residual products are, in accordance with this invention, removed from the action zone where the hydrocarbon fluid is heated and thermally converted and passed together with cooler molten material to an auxiliary chamber. The objectionable constituents collect on the top of the body of molten material in the auxiliary chamber, which is maintained in a substantially quiescent state, and are withdrawn therefrom before the molten material is returned to a suitable heating zone for reheating. In this manner uncontaminated molten material is reheated and returned to the reaction zone, thereby greatly improving the efficiency of the operation.

Any suitable reheating zone for the molten material may be employed and in the preferred method, the uncontaminated molten material leaving the auxiliary chamber may be passed through a heating zone of restricted cross-section to thereby rapidly reheat the molten material to the desired elevated temperature. The entire system for handling the molten material may be conveniently enclosed within a single furnace setting. In this manner all parts thereof will be heated by hot combustion gases and the material to be used as a heat transfer medium melted in warming up the apparatus. Moreover by enclosing the entire molten material system within a furnace setting, heat losses are prevented and more efficient operating conditions maintained.

Any suitable molten material for supplying the heat to the hydrocarbon fluid may be employed in accordance with this invention. Any suitable molten metal, such as molten lead, aluminum or any suitable alloy of various metals, or fused salts or a mixture of fused salts may be employed. The heat transfer medium will be referred to as molten material throughout the specification and claims and it is to be understood that this expression includes any suitable metal, alloy of various metals, salts or mixtures of various salts.

In order to make the invention more clearly understood, there is shown in the accompanying drawing, means for carrying the same into practical effect without limiting the improvements in their useful applications to the particular constructions which, for the purpose of explanation, have been made the subject of illustration.

Referring to the drawing wherein parts are shown in elevation and other parts in section, there is shown a furnace setting 1 provided with a suitable burner arrangement 2. Only one burner has been illustrated but obviously more than one may be used if desired. The furnace setting is provided with a series of internal baffles 3, 4 and 5 suitably positioned therein to cause the hot combustion products from the burner 2 to course through the furnace setting in a tortuous path. The baffle 3 is directly in front of the burner 2 thereby providing a space between it and the burner for effecting the desired combustion of any suitable fuel before the combustion products reach the heat absorbing surfaces, to be later described.

The hot combustion gases after coursing through the furnace setting 1 around the various baffles and heat absorbing surfaces leave the furnace setting through an outlet 6, which may be connected to a suitable preheating section for the hydrocarbon fluid to be converted.

A reaction chamber 7 containing a body of molten material 8 may be positioned in the upper portion of the furnace setting, the molten material being maintained at a substantially constant level, as indicated in the drawing. Molten material, cooled by heat exchange with the hydrocarbon fluid, and extraneous matter rise to the top of the molten bath and are withdrawn to an auxiliary chamber 9 through a suitable conduit 11. Extraneous matter is removed from the auxiliary chamber and uncontaminated molten material is returned to a heating zone to be reheated. As shown, the molten material flows through a conduit 12 from the auxiliary chamber 9 to a header 13 from which it is passed in a plurality of streams to a header 14 by means of suitable pipes or tubes 15 connecting the headers 13 and 14. The molten material in passing through the tube bank which comprises the headers 13 and 14 and interconnecting tubes 15 is subjected to the most intensive heat within the furnace setting and therein raised to the desired elevated temperature. The thus heated molten material rises from the header 14 through a conduit 16 to the lower portion of the reaction chamber 7, as illustrated.

Hydrocarbon fluids to be subjected to treatment, such as gasoline, kerosene, gas oil, reduced crude, gases or the like, preheated to the desired temperature in any suitable manner, such as by the combustion gases from the furnace setting 1 passing through the outlet flue 6 or by any other suitable means, is passed through an inlet pipe 17 into the lower portion of the body of molten material 8 maintained in the reaction chamber 7. The inlet pipe 17 may extend within the reaction chamber 7 and may be provided with a plurality of apertures 18 for dispersing the hydrocarbon fluid to be converted into the body of molten material. The hydrocarbon fluid passing upwardly through the body of molten material in dispersed form is rapidly raised to the desired conversion temperature and the desired conversion thereof accomplished within the reaction chamber 7. If desired, that portion of the reaction chamber 7 above the level of molten material may extend outside the furnace setting to prevent overheating thereof while out of contact with the molten material. The desired conversion products, such as the vaporous and/or gaseous constituents resulting from the thermal conversion or cracking of the hydrocarbon fluid pass overhead through a line 19 for further processing in any well known manner.

The hydrocarbon fluid rising upwardly in the molten material cools the molten material and the thus cooled molten material together with objectionable constituents resulting from the conversion of the hydrocarbon fluid rise to the top of the body of molten material maintained in the reaction chamber 7. In accordance with this invention, the cooler molten material and objectionable constituents are withdrawn, preferably continuously, from the reaction chamber 7 through the conduit 11 and collected in the auxiliary chamber 9, wherein the objectionable constituents rise to the top of the quiescent body of molten material. These objectionable constituents are withdrawn through an outlet line 20 controlled by a valve 21 having an elongated handle 22. A suitable plate 23 may be provided on the outside of the furnace setting to prevent escape of furnace gases through the space provided for the handle 22. The thus withdrawn objectionable constituents are passed to any suitable container without being returned to the apparatus. It will thus be seen that objectionable contaminating substances are removed from the molten material before it is returned to the tube bank 15 for reheating. The molten material in the auxiliary chamber 9 is preferably maintained at such a level that the outlet line 20 functions to skim off heavy residues resulting from thermally converting hydrocarbon fluids without causing the removal of substantially any of the molten material.

Any vaporous constituents evolved in the auxiliary chamber 9 as a result of further decomposition of the objectionable constituents in the chamber 9, as well as any which may have passed through the line 11, may be conducted from the auxiliary chamber 9 to the upper portion of the reaction chamber 7 by means of a suitable conduit 24. The conduit 24 mainly functions as an equalizing line.

The various parts of the molten material system are filled with molten material, the reaction chamber 7 and the auxiliary chamber 9 being filled to the level indicated. Any loss of molten material such as by entrapment with the objectionable constituents withdrawn through the line 20 may be replenished by introducing it into the chamber 7 in any suitable manner, such as by providing a suitable inlet line not shown.

It will thus be seen that the hot products of combustion resulting from the combustion of any suitable fuel are passed first around the tube bank 15 and thence around the reaction chamber 7 and auxiliary chamber 9. In this manner the entire apparatus, including all connections, are subjected to intense heat thereby preventing any loss of heat from the latter during the processing of the hydrocarbon fluid.

As an example of carrying out this invention, a hydrocarbon oil, for instance a clean gas oil, is preheated in any suitable manner, such as by the combustion gases from the furnace setting 1 passing through the flue 6, to a temperature of about 800° F. and then passed through the pipe 17 into the body of molten material maintained at an elevated temperature in the reaction chamber 7. The hydrocarbon oil passing through the pipe 17 may be in the so-called liquid or vapor phase depending on the character of the oil being processed, the temperature and pressure conditions, etc. The oil entering the reaction chamber 7 is dispersed throughout the body of molten material by means of the plurality of apertures 18 and is intimately contacted with the highly heated molten material. The thus dispersed oil rapidly rises through the molten material and due to the heat exchange therewith is rapidly raised to the desired cracking temperature and the desired conversion thereof completed within the reaction chamber 7. Vaporous products of cracking pass overhead through the line 19, which may be controlled by a suitable valve not shown, and processed in any well known manner. The objectionable constituents resulting from the cracking of the gas oil being unvaporized and lighter than the molten material collects on the surface of the body of molten material. These objectionable constituents together with molten material at a temperaure of about 1000 to 1100° F. are withdrawn from the reaction chamber 8 through the overflow conduit 11 and collected in the auxiliary chamber 9. The auxiliary chamber 9 acts as a trap for the objectionable constituents which are withdrawn from the surface of the molten material in the auxiliary chamber 9 through the outlet 20. The objectionable constituents may be withdrawn intermittently or continuously depending on the quantity thereof produced during the cracking reaction. Any vaporous constituents withdrawn through the overflow line 11 and evolved due to the further decomposition of the objectionable constituents in the auxiliary chamber 9 are returned to the reaction chamber 7 through the line 24 connecting the upper portions of these chambers.

Molten material uncontaminated with objectionable constituents resulting from the cracking of the oil or from reaction with the molten material freely flows from the auxiliary chamber 9 through the conduit 12 into the header 13 from which it flows in a plurality of streams through the pipes 15 into the header 14. The molten material in passing through the tube bank is raised to a temperature of about 1200° to 1300° F. and then passed to the reaction chamber 7 through the conduit 16 to thus introduce freshly heated uncontaminated molten material into the reaction chamber.

It will be noted that the system here illustrated eliminates the necessity of pumping the molten material from one part to another. As shown, the flow of molten material through the tube bank is upwardly and does not oppose the tendency of molten material to rise in the tube bank upon being heated. The entire system being enclosed in the furnace setting 1 enables an operator to bring the material, which is generally solid, at atmospheric temperatures, to a molten state in the warming up of the apparatus preparatory to the use thereof in thermally converting hydrocarbon fluids and also prevents any loss of heat from the molten material.

Any suitable pressure may be employed throughout the apparatus. The preheated oil entering the chamber 7 through the line 17 may be at a pressure of about 200 or 300 pounds per square inch or any pressure sufficiently high to overcome the pressure due to the head of molten material in the chamber 7. While certain conditions of temperature and pressure have been set forth, it is to be understood that either may be varied without departing from the spirit of the invention. For instance pressure may be maintained at approximately atmospheric above the body of molten material in the chamber 7 or if desired any elevated pressure for instance as high as 1000 pounds may be maintained. Moreover the hydrocarbon fluid to be decomposed may be preheated to a temperature of from say about 450° to 850° F. and then introduced into the molten material maintained at a temperature sufficiently high to rapidly raise the temperature of the preheated fluid to from about say 925° to 1700° F. or higher. Ordinarily when cracking hydrocarbon oils into lower boiling gasoline-like products the temperature employed will not exceed about 1300° F. and when cracking light hydrocarbons, such as normally gaseous saturated hydrocarbons, for the production of gaseous olefins or normally liquid products, temperatures above 1300° F. may be employed.

While there has been shown and described the preferred embodiment of the invention, it is to be understood that the invention is not confined to the precise details of construction herein set forth, by way of illustration, as it is apparent that many changes and variations may be made therein, by those skilled in the art, without departing from the spirit of the invention, or exceeding the scope of the appended claims.

I claim:

1. Apparatus for heating hydrocarbon fluids that comprises a furnace, a heating coil disposed in a higher temperature section of the furnace, a main vaporizing chamber disposed in a lower temperature section of the furnace, a mass of molten material within the main vaporizing chamber, means for introducing hydrocarbon fluid into contact with said molten material therein, an auxiliary chamber within said furnace adapted for containing a body of molten material therein, means interconnecting the main vaporizing chamber and the auxiliary chamber to provide for the flow of molten material and residual products from the main vaporizing chamber to the auxiliary chamber, means interconnecting the vapor spaces of the main vaporizing chamber and the auxiliary chamber, means interconnecting the heating coil with the main vaporizing chamber and the auxiliary chamber to provide for the flow of molten material through the heating coil, thence to the vaporizing chamber and auxiliary chamber, thence back to the heating coil and draw-off means at an intermediate point in the auxiliary chamber to remove residual products from the surface of the molten material therein.

2. The method of heating hydrocarbon fluids in contact with a molten material heat-carrying medium, in an apparatus comprising a main vaporizing chamber, an auxiliary chamber and a heating coil interconnected to provide for the circulation of molten material through the apparatus, that comprises applying heat to the apparatus and maintaining circulation of molten material therein so that the molten material flows in cyclic path through the heating coil, thence to the main vaporizing chamber, thence to the auxiliary chamber, thence back to the heating coil, maintaining pools of molten material in the main vaporizing chamber and auxiliary chamber, introducing hydrocarbon fluid into the pool of molten material in the main vaporizing chamber to thereby subject the hydrocarbon fluid to heating and vaporization, conducting resultant residual products from the main vaporizing chamber to the auxiliary chamber, maintaining the main vaporizing chamber and the auxiliary chamber in open vapor communication, maintaining the pool of molten material in the auxiliary chamber in a quiescent state, collecting residual products on the surface of said pool and withdrawing them from the auxiliary chamber.

DONALD S. VILLARS.